W. V. TURNER.
HIGH SPEED BRAKE.
APPLICATION FILED APR. 18, 1907.
1,078,015.
Patented Nov. 11, 1913.
2 SHEETS—SHEET 2.
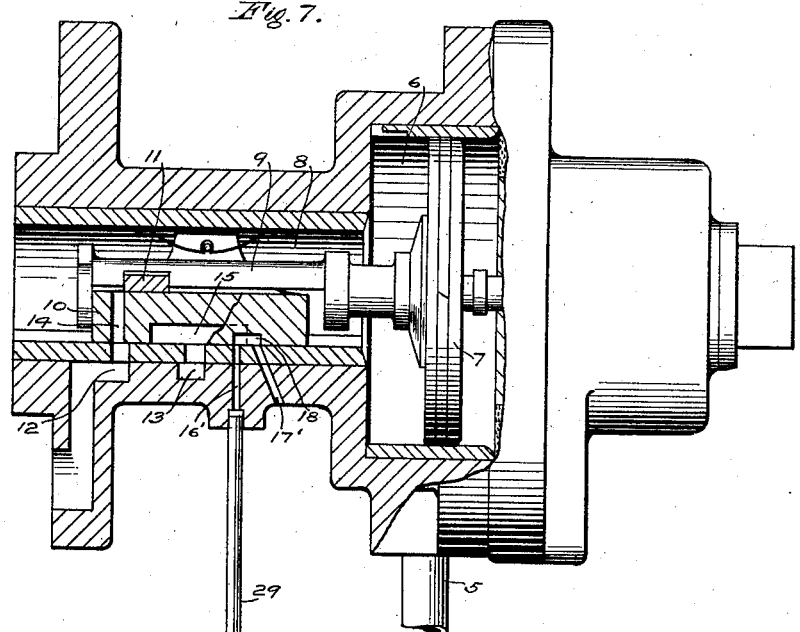
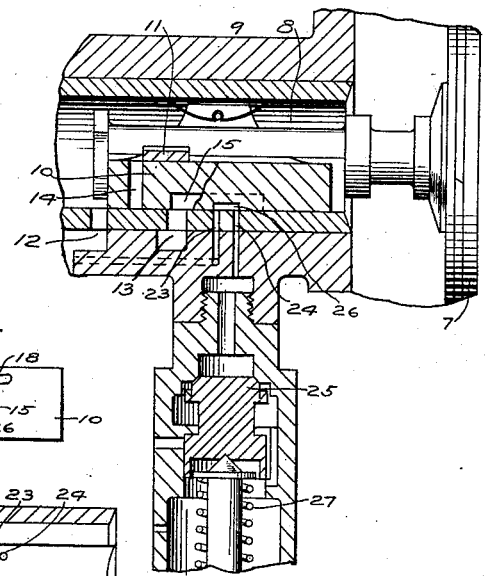
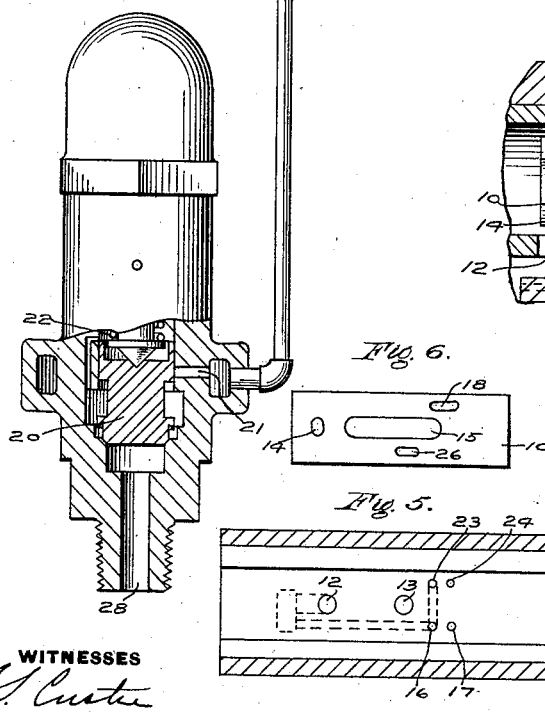
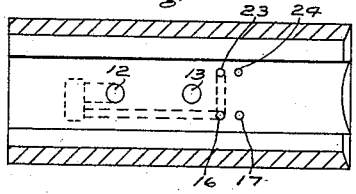
WITNESSES
INVENTOR
Walter V. Turner
by E. Wright
Att'y.

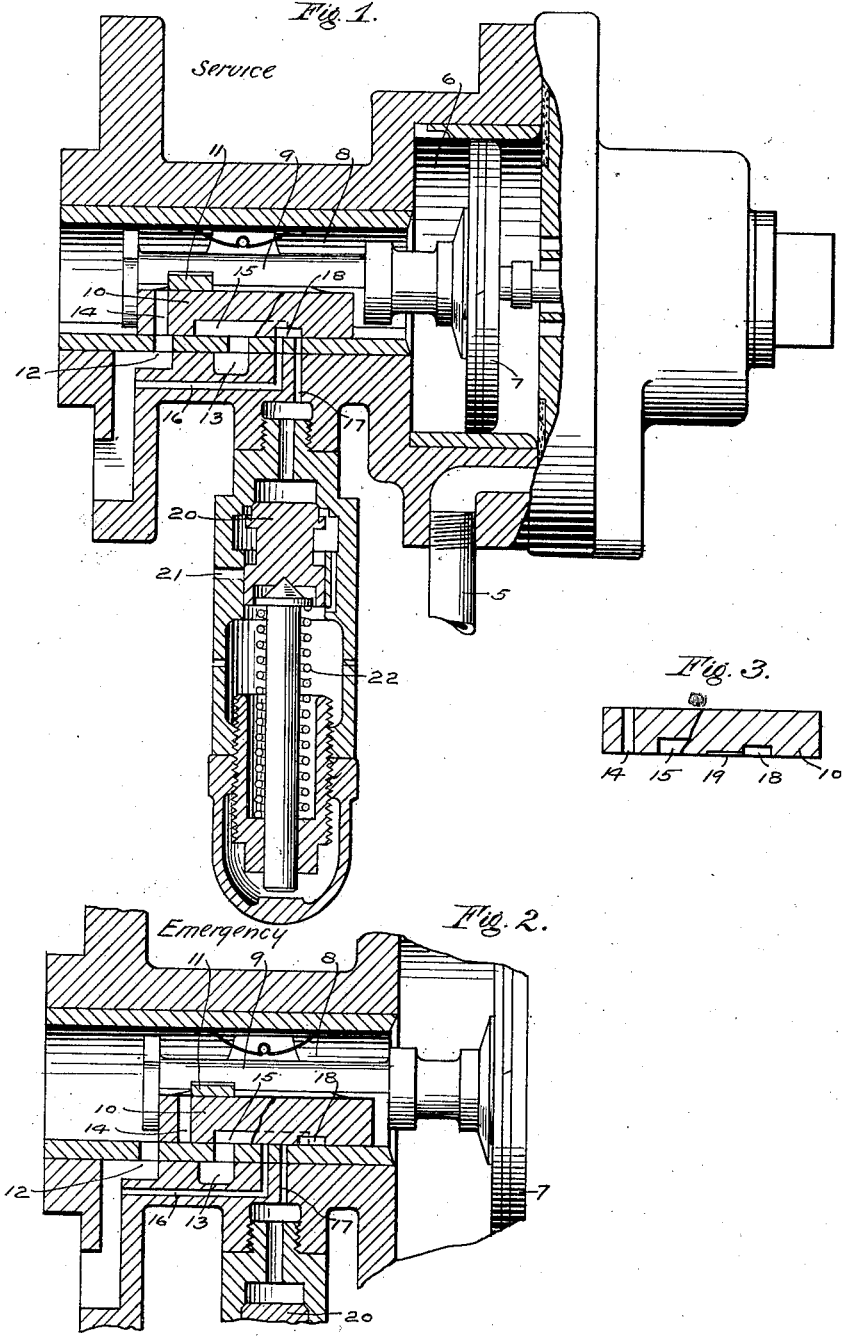

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

HIGH-SPEED BRAKE.

1,078,015.  Specification of Letters Patent.  Patented Nov. 11, 1913.

Application filed April 18, 1907. Serial No. 369,027.

*To all whom it may concern:*

Be it known that I, WALTER V. TURNER, a citizen of the United States, residing at Edgewood, in the county of Allegheny and State of Pennsylvania, have invented new and useful Improvements in High-Speed Brakes, of which the following is a specification.

This invention relates to fluid pressure brakes particularly adapted for use on trains which run at high rates of speed.

It is a well known fact that the brake shoes may be applied with a much greater degree of pressure to the wheels when running at high speeds than at low speeds without danger of sliding the wheels, and in order to provide an efficient brake for such high speed trains the degree of pressure carried in the brake system has been greatly increased. This has made it necessary to provide some device for limiting the degree of pressure which may be admitted to the brake cylinder in ordinary service applications, in order to prevent injurious sliding of the wheels when running at ordinary low speeds, and a blow down valve has heretofore been proposed for this purpose, to be attached to the brake cylinder and adjusted to limit the brake cylinder pressure to a predetermined degree in service applications, but adapted to be operated by the rapid increase in brake cylinder pressure in emergency applications to permit the accumulation of a higher brake cylinder pressure and to then gradually reduce the same to the same predetermined degree.

My present invention has a similar object in view, but comprises means operated by variations in train pipe pressure, preferably the triple valve device, for controlling the outlet from the brake cylinder through the blow down valve to the atmosphere, and adapted in ordinary service applications to give a full opening to the outlet passage, but in emergency applications to entirely close or greatly restrict said outlet passage.

In the accompanying drawings, Figure 1 is a sectional view of a triple valve device and blow down valve attached thereto embodying my improvement, the parts of the triple valve being indicated in the service application position; Fig. 2 a similar sectional view, showing the parts of the valve in emergency application position; Fig. 3 a sectional view of the main slide valve showing a slight modification; Fig. 4 a view similar to Fig. 2, but illustrating a modification having an additional high pressure blow down valve and ports for connecting the same to the brake cylinder in emergency applications; Fig. 5 a plan view of the main slide valve seat showing the arrangement of ports for this modification; Fig. 6 a face view of the main slide valve; and Fig. 7 a diagrammatic sectional view illustrating a modified form of connection for the blow down valve.

According to the construction shown on Sheet 1, a triple valve device is provided with suitable ports for controlling communication from the brake cylinder to the blow down valve, and adapted to open such communication in service application position, but to close or nearly close the same in emergency applications. The triple valve device may be of the ordinary form, comprising a train pipe connection 5, piston chamber 6, piston 7, valve chamber 8, piston stem 9, main slide valve 10, and graduating slide valve 11. The valve chamber is in open communication with the auxiliary reservoir in the usual manner and the valve seat has the brake cylinder port 12 and exhaust port 13, while the main slide valve is provided with the service port 14 and the exhaust cavity 15, all of which may correspond with the usual well known construction.

According to the one form of my improvement, an additional port 16 leads from the brake cylinder or the brake cylinder port 12 to the valve seat and another port 17 leads to a blow down valve 20 having an adjustable spring 22 and an outlet port 21, communicating between ports 16 and 17 being controlled by an additional cavity 18 in the main slide valve.

When a service application of the brakes is made the triple valve moves out to service position, as indicated in Fig. 1, in which the brake cylinder exhaust is closed, the service port 14 registers with the brake cylinder port 12 and the cavity 18 connects the ports 16 and 17. Communication from the brake cylinder is thus established with the blow off valve 20 and if the brake cylinder pressure rises above the desired degree for which the spring 22 is adjusted, the valve 20 opens and the excess pressure blows to the atmosphere through port 21, thereby limiting the brake cylinder pressure to the desired safe degree in service applications.

Upon a sudden reduction in train pipe pressure being made for an emergency application, the triple valve piston and the slide valve make a complete traverse in the usual manner to the position shown in Fig. 2, in which the brake cylinder port 12 is opened to the auxiliary reservoir and communication between ports 16 and 17 is cut off by the slide valve. The full maximum pressure then accumulates in the brake cylinder as the outlet through the blow down valve is closed.

It is also apparent that the valve device will operate to move over to its position for closing or restricting the outlet whenever the train pipe pressure is reduced below the equalized pressure of the auxiliary reservoir and brake cylinder, as in a full service application of the brakes, but in that case it would not operate to maintain a materially higher degree of brake cylinder pressure than that to which the blow-down valve is adjusted, since this excess pressure would escape from the brake cylinder through the blow-down valve and outlet passage before the valve device moved over to the position for closing or restricting the said outlet passage.

If it be desired to permit a slow and gradual reduction in the brake cylinder pressure after an emergency application, the cavity 18 in the main slide valve may be provided with a restricted extension 19, as indicated in Fig. 3, which is adapted to connect ports 16 and 17 in the emergency position of the triple slide valve and thereby produce a very slow blowing down of the brake cylinder pressure after an emergency application. According to this design, the brake cylinder pressure would be gradually reduced in emergency applications to the same degree as the maximum service pressure as determined by the spring 22 of the valve 20. But according to the modification shown in Figs. 4, 5 and 6, a higher ultimate degree of brake cylinder pressure may be held in emergency applications than in service applications, while at the same time permitting a gradual blow down from the maximum initial brake cylinder pressure to this higher ultimate degree. According to this modification additional ports, 23 communicating with the brake cylinder, and 24 leading to a second blow down valve 25, may be formed in the valve seat, while the slide valve is provided with an additional cavity 26 adapted to connect the ports 23 and 24 in emergency position, as shown, and thereby establish communication from the brake cylinder to the second blow down valve in emergency applications, while at the same time cutting out the low pressure blow down valve 20. The spring 27 of the second blow down valve is adjusted for a higher ultimate degree of brake cylinder pressure than the spring 22 of the low pressure valve and the port 24 may be restricted in size to produce a slow and gradual blowing down of the brake cylinder pressure to the degree for which the high pressure valve is adjusted in emergency applications.

It is obvious that the high pressure blow down valve may be connected directly to the brake cylinder at all times, if desired, but I prefer to connect the same through the triple valve, as described, in order that this valve may be cut out in service position and all danger of brake cylinder leakage through the same thereby eliminated in service applications of the brakes. It will also be apparent that the blow down valve may be so connected that the triple valve device, or means operated by variations in train pipe pressure, controls the outlet from the blow down valve, as indicated in Fig. 7 of the drawings, in which case the blow down valve is connected at 28 with the brake cylinder, while the outlet port 21 communicates by a passage or pipe 29 with the port 16' in the slide valve seat of the triple valve device. The port 17' leads to the atmosphere and the cavity 18 in the slide valve is adapted to connect these ports in service position, but to cut off said communication in emergency position, as previously explained in connection with Figs. 1 and 2.

The operation of this form of the device will now be readily understood without further description.

In all cases it will be noted that the triple valve device, or means operating in response to variations in the train pipe pressure, controls the outlet from the brake cylinder through the blow down valve device and is adapted to open such communication in service applications and to close or restrict the same in emergency applications.

As herein described and shown this device is identical with that covered in my former pending application Serial No. 284,840, filed October 28, 1905.

Having now described my invention, what I claim as new and desire to secure by Letters Patent, is:—

1. In a fluid pressure brake, the combination with a blow down valve for the brake cylinder, of a piston operated by variations in train pipe pressure and a valve operated by said piston for directly controlling the outlet from the brake cylinder through the blow down valve.

2. In a fluid pressure brake, the combination with a blow down valve for the brake cylinder, of a valve device subject to variations in train pipe pressure for controlling the outlet from the brake cylinder through the blow down valve and adapted to open said outlet in service applications and to substantially close or restrict the same in emergency applications.

3. In a fluid pressure brake, the combination with a blow down valve for the brake cylinder, of a triple valve device for controlling the supply of air to the brake cylinder comprising a piston and a valve operated by said piston for directly controlling the outlet from the brake cylinder through the blow down valve.

4. In a fluid pressure brake, the combination with a blow down valve for the brake cylinder, of a triple valve device having means for opening communication from the brake cylinder to the blow down valve in service position, and to substantially close or restrict such communication in emergency position.

5. In a fluid pressure brake, the combination with a brake cylinder having a low pressure blow down valve and a high pressure blow down valve, of means operated by variations in the train pipe pressure for controlling the outlet from the brake cylinder through the low pressure blow down valve.

6. In a fluid pressure brake, the combination with a brake cylinder having a low pressure blow down valve, of a triple valve device having means for controlling the outlet from the brake cylinder through the low pressure valve, and adapted to open such communication in service applications and to close the same in emergency applications.

7. In a fluid pressure brake, the combination with a brake cylinder, a low pressure blow down valve, and a high pressure blow down valve, of means operated by train pipe pressure in service applications to open the low pressure outlet and to close the high pressure outlet.

8. In a fluid pressure brake, the combination with a brake cylinder, a low pressure blow down valve, and a high pressure blow down valve, of means operating under a gradual reduction in train pipe pressure in service applications to open the outlet to the low pressure valve and close the high pressure outlet, and under a sudden reduction in train pipe pressure in emergency applications to close the low pressure outlet and open the outlet to the high pressure valve.

9. In a fluid pressure brake, the combination with a brake cylinder, a low pressure blow down valve, and a high pressure blow down valve, of a triple valve device having ports for opening communication from the brake cylinder to the low pressure valve in service applications and to the high pressure valve in emergency applications.

10. In a fluid pressure brake, the combination, with a brake cylinder, and a blow-down valve therefor, of a valve device operated by a reduction in train pipe pressure to substantially close the outlet from the brake cylinder through the blow-down valve.

11. In a fluid pressure brake, the combination, with a brake cylinder, and a blow-down valve therefor, of a valve device normally establishing communication from the brake cylinder through the blow-down valve in service applications, but operating under a certain reduction in train pipe pressure to substantially close such communication.

12. In a fluid pressure brake, the combination, with a brake cylinder having an outlet, and a blow-down valve for controlling said outlet, of a valve device adapted to hold said outlet open during ordinary service applications, but operated by a certain reduction in train pipe pressure to substantially close said outlet.

13. In a fluid pressure brake, the combination, with a brake cylinder and a blow-down valve, of a valve device subject to the opposing pressures of the train pipe and the equalized brake cylinder and auxiliary reservoir pressure when the train pipe pressure is reduced below the equalizing point, for controlling the outlet from the brake cylinder through the blow-down valve.

In testimony whereof I have hereunto set my hand.

WALTER V. TURNER.

Witnesses:
R. F. EMERY,
J. B. MACDONALD.

---

Copies of this patent may be obtained for five cents each, by addressing the "Commissioner of Patents, Washington, D. C."